US006672643B1

United States Patent
Brodskiy et al.

(12) United States Patent
(10) Patent No.: US 6,672,643 B1
(45) Date of Patent: Jan. 6, 2004

(54) RETRACTABLE VEHICLE COVER

(76) Inventors: Arkadiy Brodskiy, 1480 Sutter St. Apt. 312, San Francisco, CA (US) 94109; Boris Brodsky, 4060 Bathurst Street Apt. 802, Toronto (CA), M2R 1Z8; Leonid Brodsky, 3 Pemberton Ave., Apt. 305, Toronto (CA), M2M 4M1

( * ) Notice: Subject to any disclaimer, the term of this patent is extended or adjusted under 35 U.S.C. 154(b) by 0 days.

(21) Appl. No.: 10/270,863

(22) Filed: Oct. 15, 2002

(51) Int. Cl.[7] .................................................. B60J 11/00
(52) U.S. Cl. ................. 296/98; 296/136.01; 296/136.1; 296/136.11
(58) Field of Search .............................. 296/98, 136.01, 296/136.1, 136.11, 136.12; 160/238, 241, 243, 270, 271, 290.1, 323.1

(56) References Cited

U.S. PATENT DOCUMENTS

| | | | | |
|---|---|---|---|---|
| 1,999,171 | A | * 4/1935 | Bryant | ........................ 296/98 |
| 4,834,446 | A | 5/1989 | Tung-Chow | |
| 5,516,181 | A | 5/1996 | Thompson | |
| 6,012,759 | A | 1/2000 | Adamek | |
| 6,276,381 | B1 | 8/2001 | O'Brein | |
| 6,513,858 | B1 * | 2/2003 | Li et al. | ........................ 296/98 |
| 2001/0045758 | A1 * | 11/2001 | Vieira-Soares | ............... 296/98 |

FOREIGN PATENT DOCUMENTS

| | | | | |
|---|---|---|---|---|
| DE | 3120415 A1 | * 12/1982 | ................... | 296/98 |
| GB | 2171375 A | * 8/1986 | ................... | 296/98 |
| GB | 2243849 A | * 11/1991 | ................... | 296/98 |
| JP | 57095216 A | * 6/1982 | ................... | 296/98 |

* cited by examiner

*Primary Examiner*—D. Glenn Dayoan
*Assistant Examiner*—Lori L Coletta (57) ABSTRACT

The vehicle cover of the invention consists of three pivotally interconnected cassettes with rolls of a flexible protective cover material stored in each of the cassettes and unwoundable therefrom through a slit in the side of the cassette, similar to a photo film that can be pulled out from a film cassette. In a folded state the cassettes are arranged side by side parallel to each other. Each cassette consists of two parallel sections with the flexible material in each section wound in mutually opposite directions so that the protective flexible materials of each section can be pulled out in mutually opposite directions. The first and third cassettes are pivotally connected to the second, i.e., the intermediate cassette so that they can be turned by 90° with respect to the intermediate cassette. The ends of the flexible materials may be provided with hooks or other means for securing the materials to the vehicle body in a retracted position. Device can be provided with a guide frame attachable to the luggage rack on the vehicle's roof.

25 Claims, 8 Drawing Sheets

RETRACTABLE VEHICLE COVER

FIELD OF THE INVENTION

The present invention relates to vehicle covers, and in particular to retractable vehicle covers. The cover of the type pertaining to the invention can be used for protection of a vehicle in a storage condition from heat, sun rays, snow, and hail.

BACKGROUND OF THE INVENTION

In many countries, the automobile has become the most common method of transportation. Most automobiles are manufactured primarily of metal, and the metal is painted to protect it from oxidation and other influences detrimental to the finish. Automobile surface finish degradation may be caused by sun rays, bird droppings, tree sap and pollens, snow and ice, frost, etc.

One way to prevent damage to the surface finish of an automobile is to store the car in a garage when it is not being used. Unfortunately, there are many more cars than garages, so this solution leaves many cars outdoors.

Another way to help preserve the finish on an automobile or other vehicle is to cover the vehicle with a vehicle cover when it is not in use. Such vehicle covers are generally made of a fabric or textile such as canvas (see, e.g., U.S. Pat. No. 6,276,381 issued in 2001 to P. O'Brein). The vehicle cover may be stored in a convenient place such as the car trunk, then taken out and unfolded, and then installed on the vehicle. When the vehicle must be used, the cover is removed, allowed to dry (if necessary), folded up, and stored. One problem associated with this design is inconvenience: it takes time to fold and unfold, and store, the vehicle cover.

One variant on the vehicle cover solution is the self-storing vehicle cover. This type of cover is typically provided in a container, which may be used to store the cover. When the cover is to be used, the cover is removed from the container, and when the cover is to be stored, it is returned to the container. A number of self-storing vehicle covers have been patented, but they all suffer from various problems.

For example, U.S. Pat. No. 5,516,181 granted to Thompson in 1996 discloses a roll-up vehicle cover. This cover could be rolled up around a cylinder, which could then be stored in the vehicle's trunk. While this design provided for a storable cover, it was inconvenient and cumbersome to use, because after use, the cover had to be removed from the vehicle roof, manually rolled up, the bundle carried to the trunk of the vehicle, the trunk opened, the bundle placed inside, and the trunk closed. Deployment of this cover required all these steps to be performed, but in the reverse order. Another essential disadvantage of this cover is that the rolled up portions covers only the roof, hood, and trunk portions of the vehicle, and an additional flaps has to be buttoned or hooked to the unrolled flaps for covering the sides of the vehicle body.

Tung-Chow was granted U.S. Pat. No. 4,834,446 issued in 1989 for a road vehicle flexible cover, which is stored in a box in the vehicle trunk. While this design provided for motorized retraction of the cover, its storage box occupied a substantial amount of the trunk floor space, right in the center part of the trunk floor. In addition, this design required the trunk be opened and closed every time the cover was deployed or stored. The '446 design was also necessarily complex because it used an electric motor with an electrical wire running to the dash of the vehicle. The protective canvas comprises a folded bundle, which, after unwinding from the storage box, has to be unfolded for covering the top and sides of the vehicle.

U.S. Pat. No. 6,012,759 issued in 2000 to T. Adamek is, in general, similar to aforementioned U.S. Pat. No. 5,516,181 and is aimed at improvement of the device of the last-mentioned U.S. Patent.

More specifically, U.S. Pat. No. 6,012,759 discloses a retractable vehicle cover comprising at least one cover reel and at least one extension line reel disposed within a housing. The cover reel and the extension line reel are biased in a retracted position. Each cover reel contains a cover, and each extension line reel contains an extension line. At least one cover leading edge extends from the housing, and at least one extension line extends through each cover leading edge. An extension line cover stop allows the extension line(s) to extend a cover, and an extension line end stop prevents extension line retraction into the housing. The housing is aerodynamically shaped to reduce drag on a vehicle upon which the retractable vehicle cover is mounted. Each cover leading edge is equipped with a cover strip magnet that holds the cover in an extended position. In the alternative, the cover strip magnet may be adhered to a ferromagnetic strip on the housing, which securely holds the cover leading edge in a retracted position. The housing may comprise a housing strip magnet by means of which the retractable vehicle cover may be removably mounted on a vehicle. The problem associated with the fact that the rolled up portions covers only the roof, hood, and trunk portions of the vehicle, and that additional flaps have to be connected to the unrolled cover for covering the sides of the vehicle body, remains unsolved.

OBJECTS AND SUMMARY OF THE INVENTION

It is an object of the present invention to provide a retractable vehicle cover, which can be placed onto the roof of a vehicle and deployed into a three-dimensional structure that protects the vehicles from all sides. It is another object to provide a retractable vehicle cover that consists of three pivotally interconnected cassettes that contain wound rolls of a flexible cover material. Still another object is to provide a retractable vehicle cover of the aforementioned type that can be removably attached to a luggage rack on the roof of the vehicle.

The vehicle cover of the invention consists of three pivotally interconnected cassettes with rolls of a flexible protective cover material stored in each of the cassettes and unwoundable through a slit in the side of the cassette, similar to a photo film that can be pulled out from a film cassette. In a folded state the cassettes are arranged side by side parallel to each other. Each cassette consists of two parallel sections with the flexible material in each section wound in mutually opposite directions so that the protective flexible materials of each section can be pulled out in mutually opposite directions. The first and third cassettes are pivotally connected to the second, i.e., the intermediate cassette, so that they can be turned by 90° with respect to the intermediate cassette. Thus, when the battery of three parallel cassettes is placed onto the vehicle's roof, and the first and third cassettes are turned by 90°, the flexible materials contained in the sections of these two cassettes can be pulled out in opposite directions and to cover the sides of the vehicle body, while the materials stored in the sections of the intermediate cassette can be pulled out for covering the entire top portion of the vehicle body. The ends of the flexible materials may be provided with hooks or other means for securing the materials to the vehicle body in a retracted position. The cassette sections contain spiral springs located in the end face portions of the cassettes. The springs are connected to the edges of flexible materials and are intended for retracting the material back into the cassette section once they released from attachment to the vehicle body. Device can be provided with a guide frame attachable to the luggage rack on the vehicle's roof and used for moving the first and third cassettes in lateral directions for turning the cassettes to the operation positions from more convenient location on the vehicle's roof.

DETAILED DESCRIPTION OF THE INVENTION

Figures 1, 2:
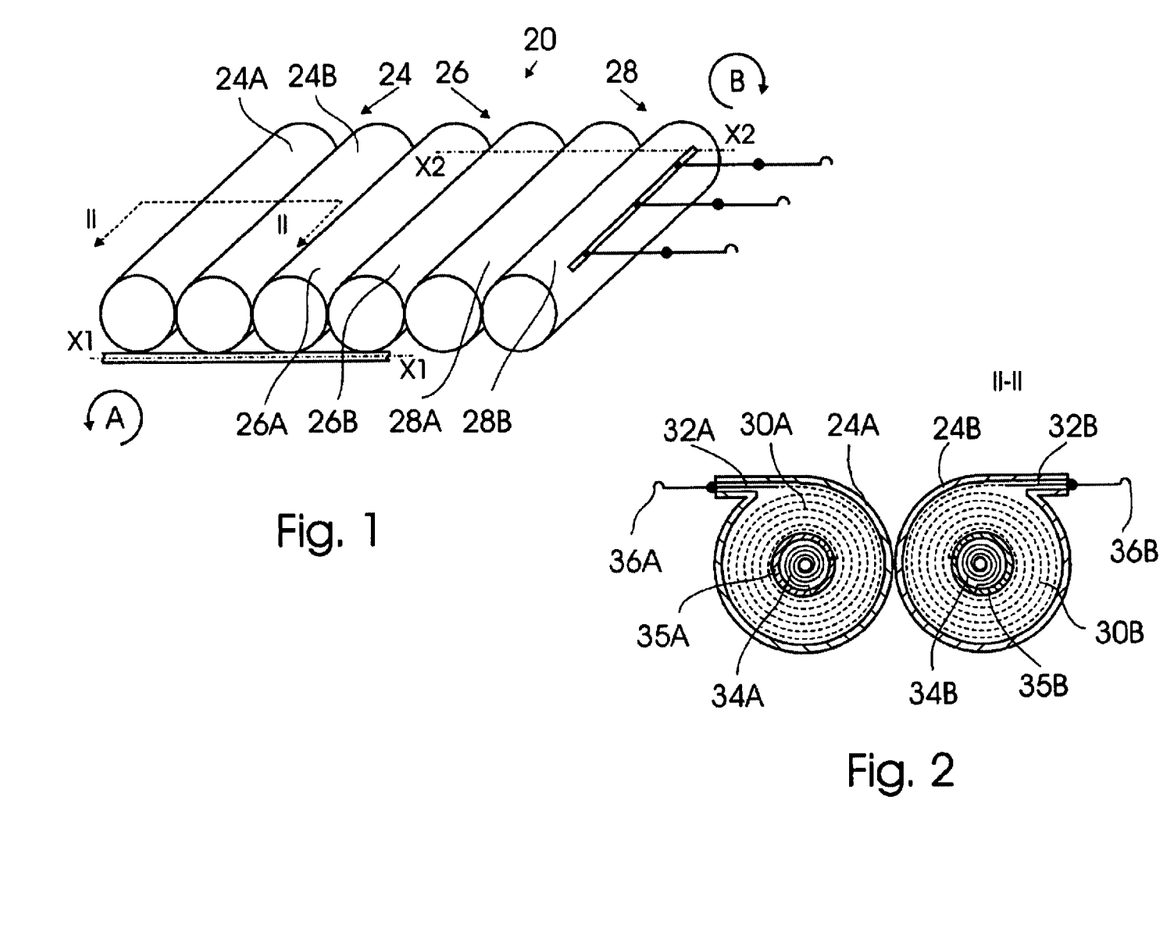
FIG. 1 is a simplified general three-dimensional view of a vehicle cover assembly in accordance with one embodiment of the present invention.
FIG. 2 is a cross-sectional view of a doubled cassette unit along line II—II of FIG. 1.

A simplified general three-dimensional view of a vehicle cover assembly 20 of the present invention is shown in FIG. 1. It can be seen that the vehicle cover assembly 20 consists of three pivotally interconnected doubled cassette units 24, 26, and 28, which in a folded state of the cover assembly 20 are arranged side by side parallel to each other. Each doubled cassette unit consists of two parallel sections with the flexible material in each section wound in mutually opposite directions so that the protective flexible materials of each section can be pulled out in mutually opposite directions. Thus, the doubled cassette unit 24 consists of cassettes 24a, 24b, doubled cassette unit 26 consists of cassettes 26a, 26b, and doubled cassette unit 28 consists of cassettes 28a, 28b (FIG. 1).

FIG. 2 is a cross-sectional view of the doubled cassette unit 24 along line II—II of FIG. 1. Since the structure of other cassette units 26 and 28 is essentially the same, the following description will refer only to the cassette unit 24, assuming that this description relates to other cassette units as well. Each cassette 24a and 24b of the cassette unit 24 is constructed similar to a photo cassette with the film that can be pulled out from the cassette. More specifically, it contains a respective roll of a flexible protective cover material web 30a, 30b stored in each of the cassettes and unwoundable through a respective slit 32a, 32b. The cassettes 24a, 24b contain spiral springs 34a, 34b located in holder 35a, 35b, respectively. Although for simplicity of the illustration the springs are shown attached to the inner ends of the cover material webs 30a, 30b, the springs can be connected to the side edges of flexible materials and are intended for retracting the material back into the cassettes 24a, 24b once they released from attachment to the vehicle body. Hooks 36a, 36b or other means for securing to the vehicle body (not shown in FIGS. 1 and 2) are attached to the outermost ends of the flexible material webs 30a, 30b. The securing hooks 36a, 36b have dimensions greater than the width of the slits 32a, 32b and therefore cannot be pulled into the cassette.

The webs 30a, 30b can be made from a strong, easily-wound material, preferably with the surface having waterproof and light-resistant properties. Examples of such a material are rough canvas, sailcloth, rubberized fabric, etc.

The first and the third doubled cassette units 24 and 28 are pivotally connected to the second, i.e., the intermediate doubled cassette unit 26 so that they can be turned by 90° with respect to the intermediate doubled cassette unit 26. If necessary, the first and third cassette units can be hinged to a common plate on which all three cassette units are supported. In the embodiment shown in FIG. 1, the first doubled cassette unit 24 is hinged to the second doubled cassette unit 26 with possibility of rotation around axis X1-X1 in a plane perpendicular to the plane of the cover assembly 20 in the direction of arrow A (FIG. 1). Similarly, the third doubled cassette unit 28 is hinged to the second doubled cassette unit 26 with possibility of rotation around axis X2-X2 in a plane perpendicular to the plane of the cover assembly 20 in the direction of arrow B (FIG. 1). The entire cover assembly 20 can be secured to the roof of a vehicle, e.g., by a magnet support (not shown) or by attachment to the roof-type luggage rack (not shown).

Such an attachment will be described later with reference to other embodiments of the invention.

Figure 3:
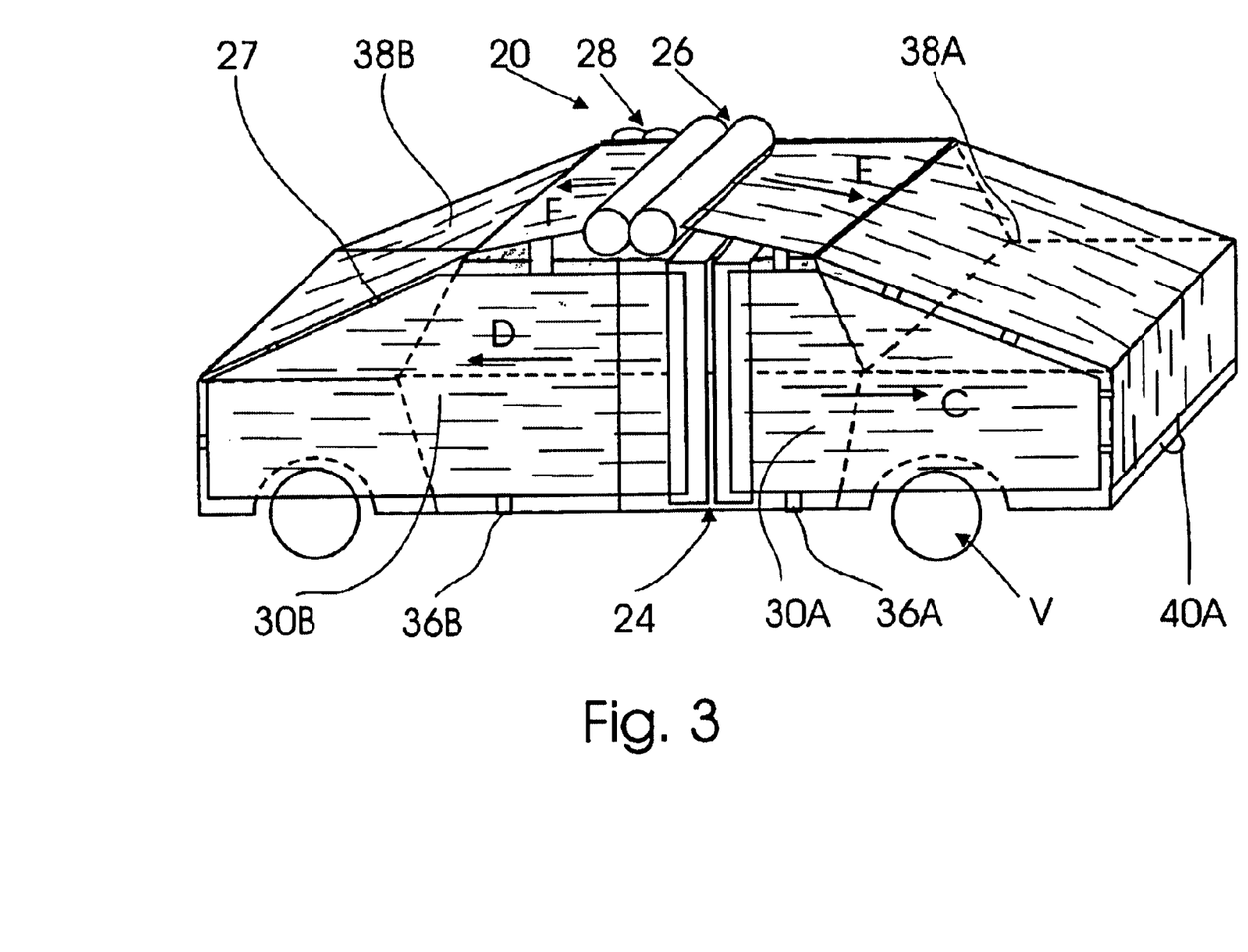
FIG. 3 is a three-dimensional view of the cover assembly of FIG. 1 in a deployed state over a vehicle.

FIG. 3 is a three-dimensional view of the cover assembly 20 with the vehicle cover in a deployed state over a vehicle. For use, a battery of three parallel doubled cassette units 24, 26, 28 is placed onto the roof of a vehicle V, and the first and third cassette units 24 and 28 are turned by 90° (FIG. 3) around their respective hinge axes X1-X1 and X2-X2. As a result, the doubled cassette units 24 and 28 will hang down from the roof and assume vertical positions shown in FIG. 3 by the cassette unit 24 (the hanging down position of the cassette unit 28 is not seen in FIG. 3).

The flexible material webs (only webs 30a, 30b of the doubled cassette unit 24 are designated in FIG. 3 but can be considered essentially similar to those of other units) contained in the sections of the side cassette units 24 and 28. are then pulled out in opposite directions (as shown by arrows C and D in FIG. 3) and cover the sides of the vehicle V. The cover webs 30a, 30b are secured in place by engaging the hooks 36a, 36b to the vehicle body, e.g., to the vehicle chassis. Similar to the sides of the vehicle, the top portion of the vehicle, i.e., the hood, saloon, and the trunk potion, can be coated with the protective webs 38a, 38b by pilling them out from the intermediate doubled cassette unit 26, which remains on the vehicle's roof, in the direction of arrows E, F (FIG. 3) and by securing the hooks (only a hook 40a is shown) to the lower edges of the vehicle's body. If necessary, the side flaps can be attached to the top flaps by friction straps 27 (FIG. 1) with tiny hooks and loops (Velcro-type connection).

Figure 4:
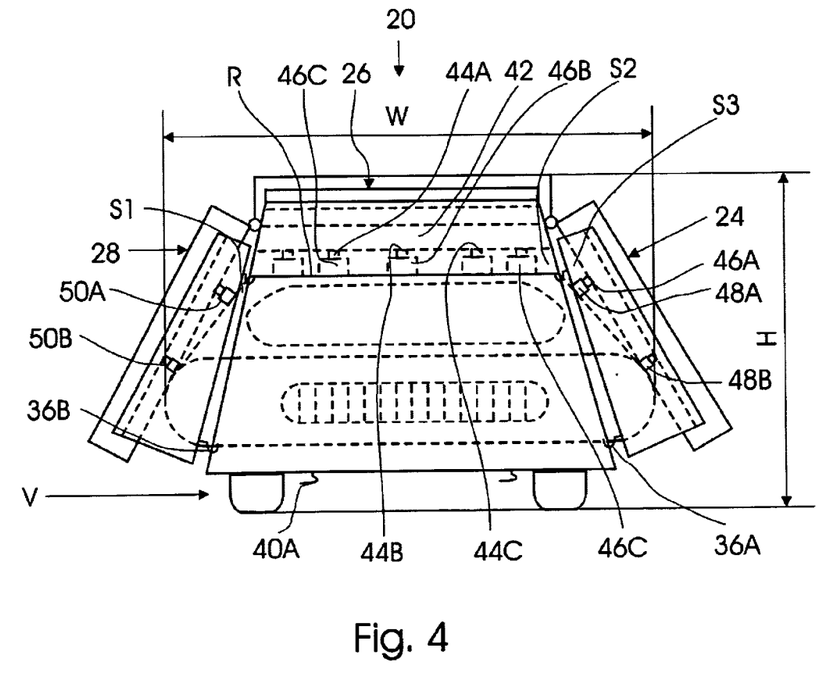
FIG. 4 is a front view of the vehicle cover of FIG. 3.

FIG. 4 is a front view of the vehicle cover assembly 20 shown in FIG. 3, which illustrates working positions of all three doubled cassette units 24, 26, and 28 on vehicle V. It is shown that in order to provide ventilation spaces S1, S2, S3 between the assembly 20 and the vehicles body, the entire assembly may be supported by a platform 42 that can be attached to the vehicle's roof R (FIG. 4) via spacers 44*a*, 44*b*, 44*c* with suction cups 46*a*, 46*b*, 46*c*. Similar spacers 48*a*, 48*b*, 50*a*, 50*b* can be placed between the cassette units 28, 24 and the side doors of the vehicle V.

Uncovering of the vehicle V is carried out in a reverse order and practically does not require any efforts. For uncovering, the hooks (such as the hook 40*a* shown in FIG. 3) are disengaged from the vehicle's body, the covering materials are released and retracted back into a wound position shown in FIG. 2 under the effect of spiral springs 34*a* and 34*b*. After retraction of the protective flexible webs, the cassette units 24, and 28 are turned back and laid parallel to the unit 26 on the vehicle's roof R, so that the assembly 20 assumes a condition shown in FIG. 1 and can be removed from the vehicle's roof for storage.

Figure 5:
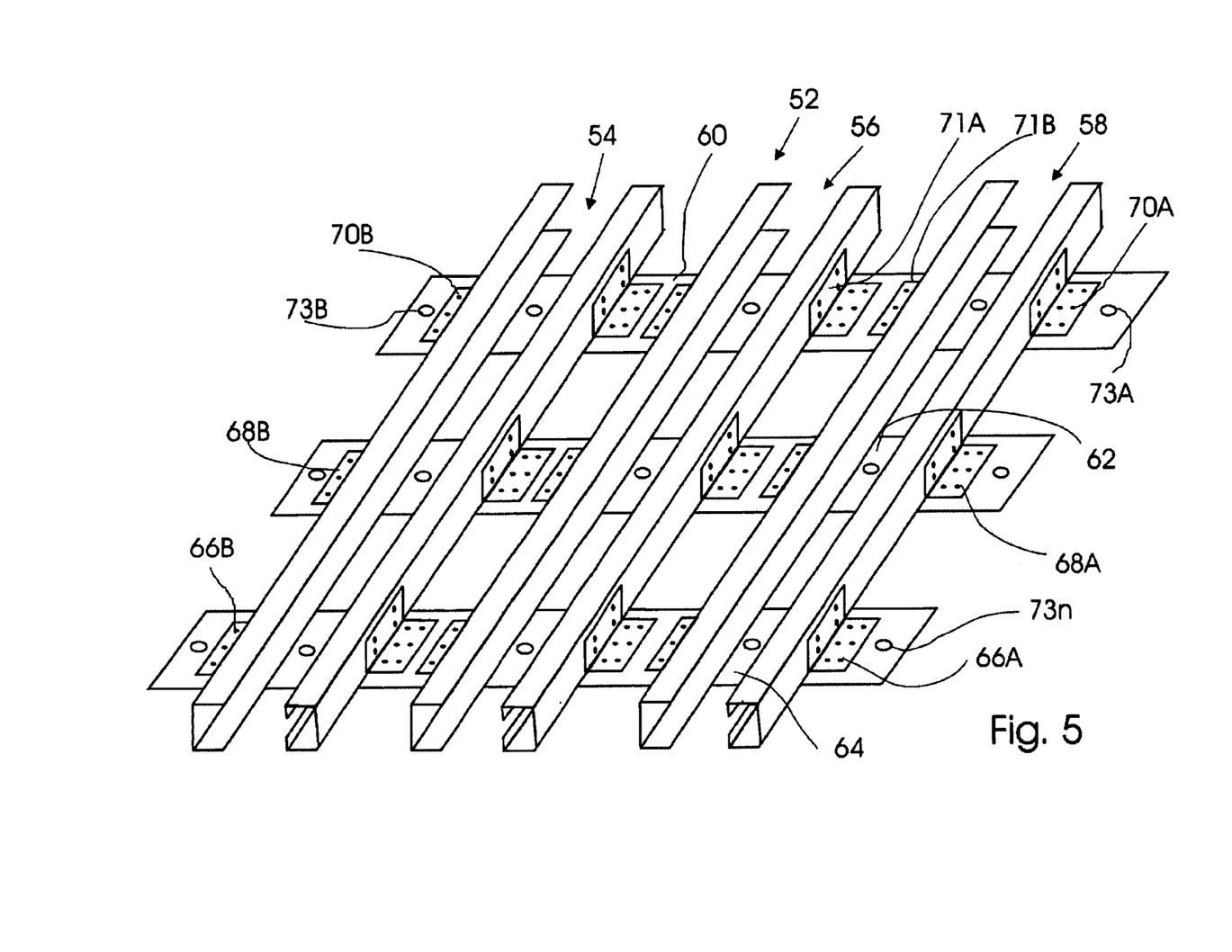
FIG. 5 is a three-dimensional view of a guide frame that can be used for supporting and storing the vehicle cover assembly of the invention on the vehicle's roof.
Figure 6:
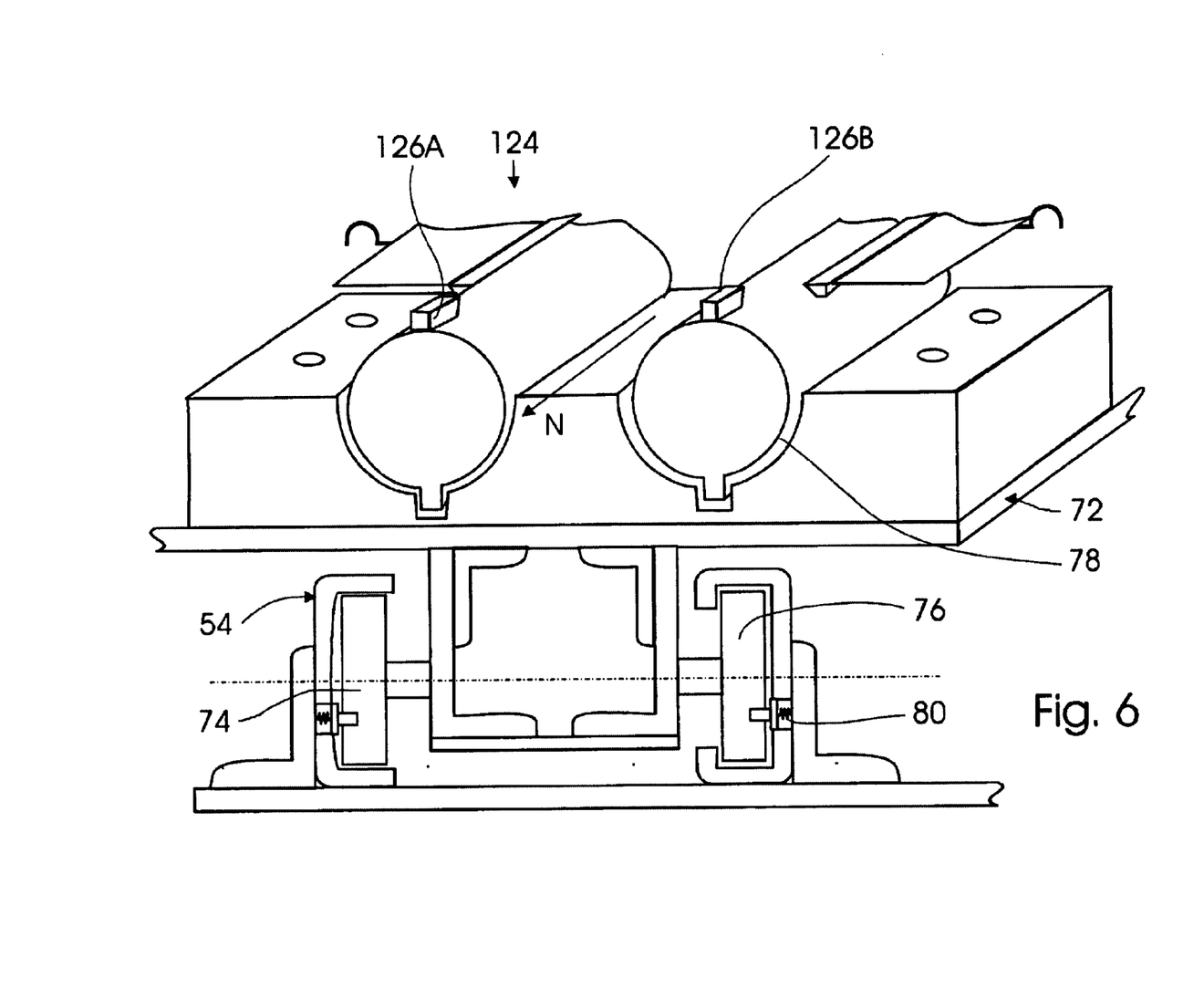
FIG. 6 is a fragmental three-dimensional view of a part of the guide frame of FIG. 5 with one of the doubled cassette units inserted into the guide frame.

FIG. 5 is a three-dimensional view of a guide frame 52 that can be used for supporting and storing the assembly 20 on the vehicle's roof R instead of the platform 42 with the spacers 44*a*, 44*b*, 44*c* shown in FIG. 4. The use of the guide frame 52 may be preferable also in view of the fact that the height H of the vehicle (FIG. 4) may be shorter or longer than the width W of the vehicle, so that in a turned position the lateral cassettes 24 and 28 may be either too short to entirely cover each side of the vehicle's body or too long and interfere with the ground. These problems can be solved with the use of the aforementioned guide frame 52. FIG. 6 is a fragmental three-dimensional view of a part of the guide frame 52 with one of the doubled cassette units, e.g., a unit 124, being inserted into the guide frame 52. In the embodiment, the term "cassette unit" relates to a pair of independent cassettes which may be not interconnected to each other but fixed together in use.

As shown in FIG. 5 and FIG. 6, the guide frame 52 consists of three guides 54, 56, and 58 arranged in three parallel rows and interconnected by lower stripes 60, 62, 64. Angular members such as 66*a*, 66*b*, 68*a*, 68*b*, 70*a*, 70*b*, 71*a*, 71*b* are attached to the sides of guides 54, 56, and 58, respectively, and the hole 73*a*, 73*b*, ... 73*n* in the stripes 60, 62, 64 are used as mounting elements for attachment of the guide frame 52, e.g., to the luggage rack (not shown) on the vehicle roof.

Figure 7:
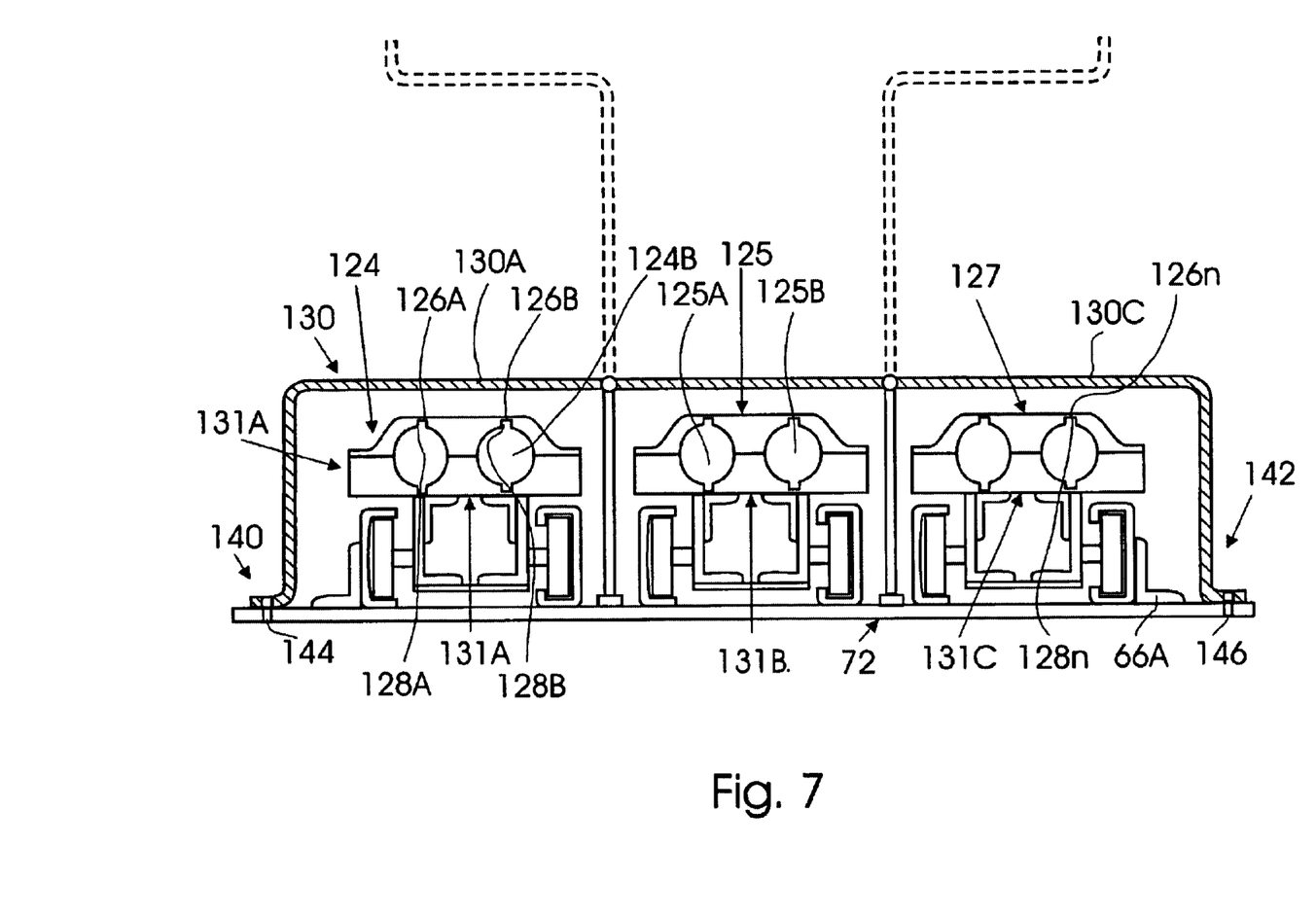
FIG. 7 is a sectional view of the cover, which is placed onto the cassette units for protection.

As shown in FIG. 6, each doubled cassette unit (only cassette unit 124 is shown in this drawing) is rigidly attached to a hollow support frame, such as frame 72 in FIG. 6, with side rollers 74, 76 (only two of which are seen in FIG. 6), which are guided by rolling in the respective guides (such as the guide 54 in FIG. 6). It is understood that three such doubled cassette units are guided on rollers in the three guides 54, 56, 58 in the transverse direction of the vehicle, when the support frame 72 is attached to the roof luggage rack of the vehicle. The upper surface of the support frame may have transverse cylindrical recesses 78 extending in the direction of the guides 54, 56, 58 and intended for accommodation of the cassette units, such as the cassette unit 124 shown in FIG. 6. In order to prevent falling of the cassettes out from the recesses 78, a retractable stopper 80 can be installed on the side wall of the guide 54. Furthermore, in order to fix cassette units 125, 124, 127 (FIG. 7) against rolling in the recesses and to prevent them from movement in the vertical direction, each cassette unit is provided with short radial outward ribs, such as ribs 126*a*, 126*b*, ... 126*n* formed on the ends of the cassettes for engagement with grooves 128*a*, 128*b*, ... 128*n* formed in respective yokes 131*a*, 131*b*, 131*c* which are put onto the ends of the respective cassettes (FIG. 7). The yokes prevent the cassette units from falling out from the grooves 78 (FIG. 6) by moving in a vertical direction, but do not create an obstacle for the cassette units for moving in a lateral direction along the guides. The yoke grooves 128*a*, 128*b*, ... 128*n* are fit onto the ribs 126*a*, 126*b*, ... 126*n* of the cassette units. The yokes can be fixed to the upper surface of the guide frame 52 (FIG. 6), e.g., by bolts (not shown).

In FIG. 7, reference numeral 130 designates a common cover, which can close the entire vehicle cover assembly from above. FIG. 7 is a sectional view of the cover 130, which is placed onto the respective cassette units 125, 126, 127. The cover 130 consists of three pivotally connected parts 130*a*, 130*b*, 130*c* and has flanges 140 and 142 with holes 144, 146 for attachment of the cover to the upper surface of the support frame 72, e.g., with bolts or special lock for preventing unauthorized opening (not shown). The cover 130 protects the cassette units during transportation or storage on the vehicle's roof.

Figure 8:
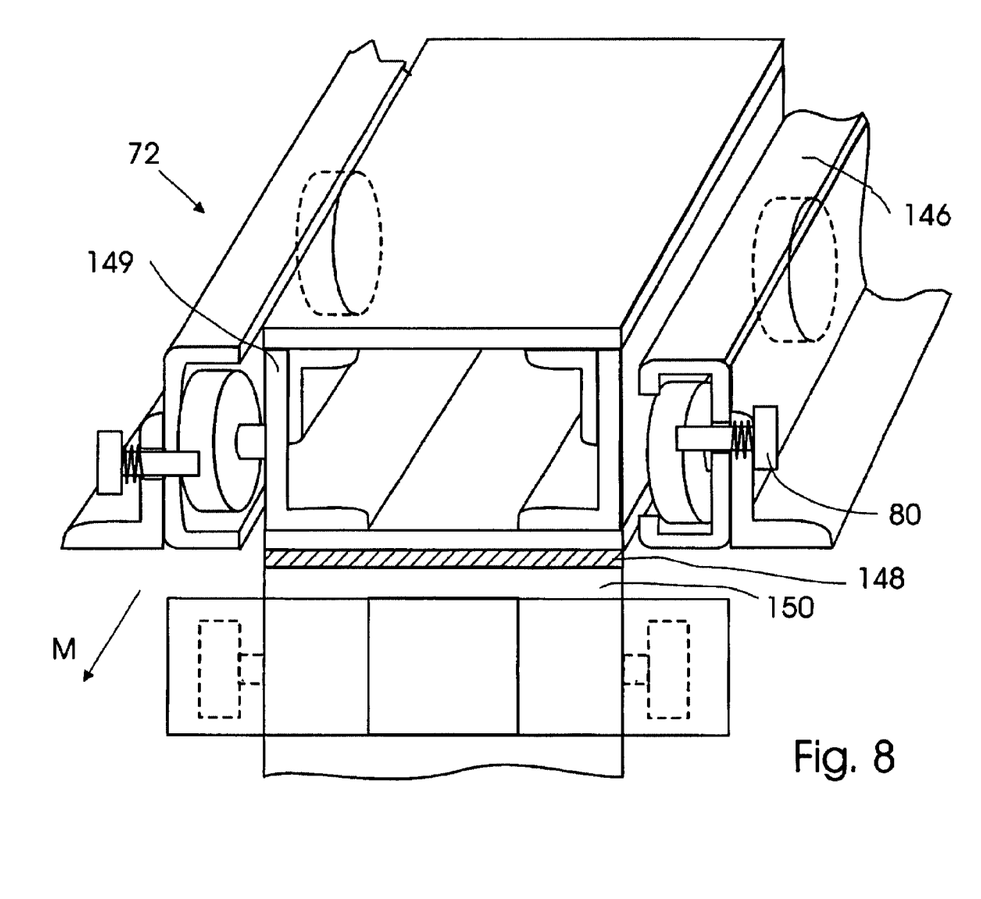
FIG. 8 is a three-dimensional view on the end of the cassette supporting carriage slidable in the guide frame and turned down by 90° into a working position for covering the lateral side of the vehicle.

FIG. 8 is a three-dimensional view on the end of the cassette supporting carriage 149 slidable in the guide frame 72 and turned down by 90° into a working position for covering the lateral side of the vehicle (the cassette unit is not shown for simplicity of the drawing). As can be seen from FIG. 8, each cassette supporting carriage consists of a short rear end 146 and a main body 150, which supports the cassettes (not shown). The main body 150 is hinged to the rear end 146 at 148, so that when the cassette unit 124 (FIG. 7) is shifted sidewise in the direction of arrow M (FIG. 8), the main body 150 with both cassettes fixed in it by the aforementioned stoppers 80 (FIG. 6) could be turned into the position shown in FIG. 8. When the main body 150 is turned down to the position shown in FIG. 8, the spring-loaded stopper 80 will project inward and will prevent the carriage 149 from falling out of the guide. For insertion of the main body into the guide, the spring-loaded stopper 80 is pulled out from the path of the carriage.

Figure 9:
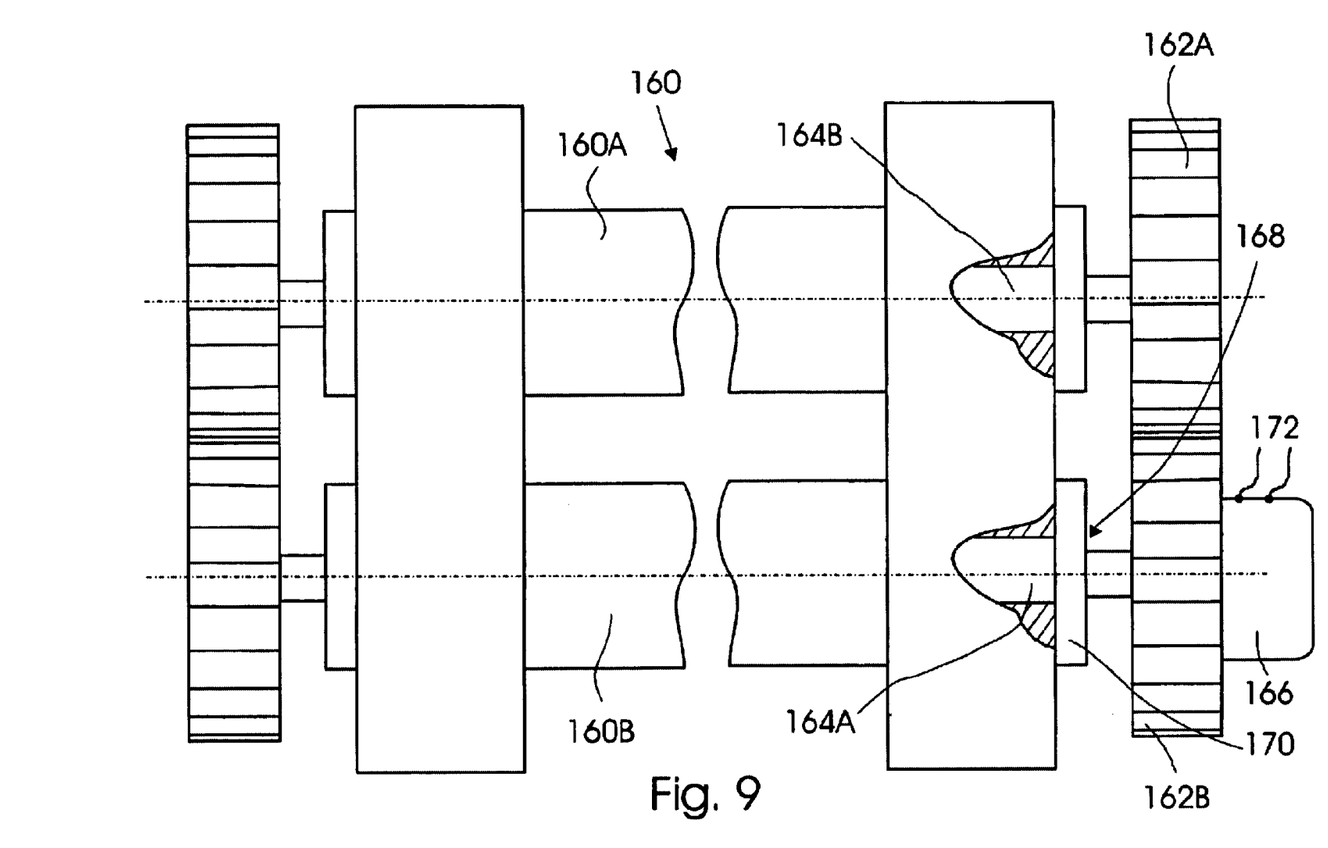
FIG. 9 is a top view on a cassette unit of the embodiment with the motor-driven retraction of the protective webs into the respective cassette.

For convenience of retraction of the protective webs, such as webs 30*a*, 30*b* shown in FIG. 2, into the respective cassettes, each cassette unit can be equipped with an electric motor and a gear mechanism. This is shown in the embodiment of FIG. 9, where cassettes 160*a* and 160*b* of a cassette unit 160 support gear wheels 162*a* and 162*b* which are meshed with each other and are attached to the ends of the cassette shafts 164*a* and 164*b* projecting from the cassettes 160*a*, 160*b*. One of the shafts, i.e., the shaft 164*a* is connected to the output shaft of an electric motor 166. The motor 166 is mounted on a bracket 168, which is attached to the end flange 170 of the cassette unit 160. The electric lead wires 172 of the motor 166 can be guided under the vehicle's hood and connected to terminals of the accumulator battery (not shown). The motor can be switched on/off via a remote controlled switch with the push button on the key holder. If necessary, the switches for the motors of all three cassette units can be installed on the guide frame under the common cover 130 shown in FIG. 7.

For placing the retractable vehicle cover of the invention, e.g., the retractable cover of the type shown in FIGS. 5 through 9, into a storage or transportation position on the vehicle's roof, the guide frame 52 is attached to the luggage rack (not shown) on the roof of the vehicle so that the guides 54, 56, and 58 are arranged in the transverse direction of the vehicle. The guide frame 52 can be attached by using flanges 66*a*, 66*b* (FIGS. 5 and 6). The cassette units, such as unit 124 shown in FIG. 6, are then inserted into the guides 54, 56, and 58 from the ends of the guides by pulling out stoppers 80 from the path of the cassette units (FIG. 6). The cassette units are moved into the guide frame by rolling the rollers 74, 76 along the guides, such as the guide 54 shown in FIG. 6. After the cassette unit 124 is pushed to the end each respective recess (such as the recess 78 shown in FIG. 6) of the guide frame and assumes the position shown in FIG. 6, the retractable stopper 80 is pushed forward, e.g., under the effect of the spring (not shown) and locks the cassette unit 124 against movement in the lateral direction shown by arrow N in FIG. 6, i.e., outwardly from the vehicle. The cassette unit 124 (as well as other two cassette units) is then covered with the yoke 131a (only one yoke 131a is designated in FIG. 7) so that the grooves 128a are fit onto the ribs 126a, and the cassette units are locked against movement in a vertical direction by attaching the yokes to the upper sides of the carriages 149 by bolts (not shown). The cover 130 can be locked by a special lock (not shown) against unauthorized access to the cassettes.

When it is required to deploy the webs into a working position, the cover 130 is removed from the cassette units (such as unit 124), the measerable stopper lock 80 is pulled out of the way of the cassette unit, the outer cassette units (such as the first unit 24 and the third unit 28 shown in FIG. 1) are shifted in the transverse directions of the vehicle along their respective recesses 78, respectively in the direction of arrow N (FIG. 6) for one of the units and in the opposite direction for the other unit. These movements are facilitated by the provision of the rollers 74, 76 that roll in their respective guides 54, 56, 58 (FIG. 5). If the device is provided with the motor, such as the motor 166 shown in FIG. 9 and intended for retracting the webs into the cassettes, prior to deployment of the protective webs, the lead wires are connected to the plus and minus terminals of the accumulator battery (not shown) under the hood of the vehicle.

When each cassette unit, such as unit 124, approaches the end of its lateral movement in the direction of arrow N, and the hinge 148 reaches the edge of the guide frame 124, the respective main body of the carriage drops down and turns by 90° to the position shown in FIG. 3 for the cassette unit 24. Further lateral movement of the unit 124 is prevented by engagement of the stopper 80 with the guide.

The protective webs, such as webs 30a and 30b shown in FIG. 2, are then pulled out from all the cassettes 24a, 24b, etc. of the double cassette units, and are fixed to the vehicle body, e.g., by hooks, such as the hook 40a shown in FIG. 3. If necessary, spacers, such as spacers 44a, 44b, 44c, can be placed between the surfaces of the webs and the vehicle body (FIG. 4).

Thus it has been shown that the invention provides a retractable vehicle cover, which can be placed onto the roof of a vehicle and deployed into a three-dimensional structure that protects the vehicles from all sides, the cover consisting of three pivotally interconnected cassette units that contain wound rolls of a flexible cover material. The retractable vehicle cover of the invention can be removably attached to a luggage rack on the roof of the vehicle.

The invention has been shown and described with reference to specific embodiments, which should be construed only as examples and do not limit the scope of practical applications of the invention. Therefore any changes and modifications in technological processes, constructions, materials, shapes, and their components are possible, provided these changes and modifications do not depart from the scope of the patent claims. For example, the vehicle cover of the invention can be attached to the vehicle roof with the use of a magnet. The cassette units and the guide frame may have any other configuration convenient for use. The protective webs can be retracted with the use of a crank handle attached to the cassette axis. Other means than hooks can be used for securing the edges of the webs to the vehicle body. If necessary, with implementation special brackets the guide frame can be used for attachment of skies or surfer boards, instead of the vehicle cover. If necessary, the lateral flaps of the protective cover of the invention can be used as tents.

What is claimed is:

1. A retractable vehicle cover for a deployment from the roof of a vehicle into a deployed position over the vehicle's roof and both sides, said vehicle having a longitudinal direction which coincides with the direction of movement of said vehicle, said retractable vehicle cover comprising:

at least a first cassette unit, a second cassette unit, and a third cassette unit which are all arranged parallel to each other, said second cassette unit having one lateral side and a second lateral side opposite to said first lateral side, said first cassette unit and said second cassette unit having a first common axis along said one lateral side on which said first cassette unit is hinged to said second cassette unit, said third cassette unit and said second cassette unit having a second common axis along said second lateral side on which said third cassette unit is hinged to said second cassette unit, so that said first cassette unit can be turned by 90 degrees in a one direction around one of said common axes, while said second cassette unit can be turned by 90 degrees around the second of said common axes in a second direction opposite to direction one direction;

each of said first cassette unit, said second cassette unit, and said third cassette unit consisting of a pair of cassettes with a web of a flexible material in each of said cassettes wound in each cassette of said pair in opposite direction to each other, so that said web material could be pulled out from each of said cassettes of each said pair in mutually opposite directions.

2. The retractable vehicle cover of claim 1, wherein each said cassette of each said pair has a slit for pulling out said web material through said slit, and each said web material has an inner end fixed in each said cassette and an outer end with means for attachment of said web material to said vehicle, said means for attachment having dimensions greater than said slit in order to prevent penetration of said means for attachment into each said cassette.

3. The retractable cover of claim 2, further provided with spacers placed between said web material and said vehicle in said deployed position of said retractable cover.

4. The retractable cover of claim 3, wherein said spacers comprise suction cups.

5. The retractable vehicle cover of claim 1, wherein said means for attachment comprises a hook.

6. The retractable vehicle cover of claim 2, further comprising a guide frame with means for securing said retractable vehicle cover to said vehicle's roof, said guide frame having a first guide for insertion and guiding said first cassette unit, a second guide for insertion and guiding said second cassette unit, and a third guide for insertion and guiding said third cassette unit in a direction transverse to said longitudinal direction.

7. The retractable vehicle cover of claim 6, wherein each said guide has means for preventing each said cassette from falling out from said guide at the end of said guiding in said direction transverse to said longitudinal direction and radially outwardly from said vehicle.

8. The retractable vehicle cover of claim 6, further provided with a cassette locking means for locking each said cassette unit against movement in a vertical direction, said locking means having first engagement means, each said cassette unit having second engagement means which engages said first engagement means when said locking means is placed onto each said cassette unit for locking each said cassette unit in said guide frame against movements in a vertical direction.

9. The retractable vehicle cover of claim 8, wherein said means for attachment comprises a hook.

10. The retractable vehicle cover of claim 2, wherein each said cassette unit contains spring means connected to web material and normally tending to return said web material into each said cassette.

11. The retractable vehicle cover of claim 10, further comprising a guide frame with means for securing said retractable vehicle cover to said vehicle's roof, said guide frame having a first guide for insertion and guiding said first cassette unit, a second guide for insertion and guiding said second cassette unit, and a third guide for insertion and guiding said third cassette unit in a direction transverse to said longitudinal direction.

12. The retractable vehicle cover of claim 9, wherein each said guide has means for preventing each said cassette unit from falling out from said guide at the end of said guiding in said direction transverse to said longitudinal direction and radially outwardly from said vehicle.

13. The retractable vehicle cover of claim 10, further provided with a cassette locking means for locking each said cassette unit against movement in a vertical direction, said locking means having first engagement means, each said cassette unit having second engagement means which engages said first engagement means when said locking means is placed onto each said cassette unit for locking each said cassette unit in said guide frame against movements in a vertical direction.

14. The retractable vehicle cover of claim 11, wherein said means for attachment comprises a hook.

15. The retractable vehicle cover of claim 6, where each said cassette unit has rollers rolling in each said guide.

16. The retractable vehicle cover of claim 11, where each said cassette unit has rollers rolling in each said guide.

17. The retractable vehicle cover of claim 2, wherein each said cassette unit further comprises drive means for retracting each said web material into each said cassette.

18. The retractable vehicle cover of claim 17, wherein each said cassette has a shaft onto which said web material is wound and to which said inner end of said web material is attached, said drive means comprising a pair of meshed gears each attached to said shaft of each said cassette and a drive motor connected to one of said shafts.

19. The retractable vehicle cover of claim 6, wherein each said cassette unit further comprises drive means for retracting each said web material into each said cassette.

20. The retractable vehicle cover of claim 19, wherein each said cassette has a shaft onto which said web material is wound and to which said inner end of said web material is attached, said drive means comprising a pair of meshed gears each attached to said shaft of each said cassette and a drive motor connected to one of said shafts.

21. The retractable vehicle cover of claim 11, wherein each said cassette unit further comprises drive means for retracting each said web material into each said cassette.

22. The retractable vehicle cover of claim 21, wherein each said cassette has a shaft onto which said web material is wound and to which said inner end of said web material is attached, said drive means comprising a pair of meshed gears each attached to said shaft of each said cassette and a drive motor connected to one of said shafts.

23. The retractable vehicle cover of claim 6, further provided with a common protective cover that covers said entire vehicle cover from above, has means for attachment to said guide frame.

24. The retractable vehicle cover of claim 8, further provided with a common protective cover that covers said entire vehicle cover from above, has means for attachment to said guide frame.

25. The retractable vehicle cover of claim 11, further provided with a common protective cover that covers said entire vehicle cover from above, has means for attachment to said guide frame.

* * * * *